(12) United States Patent
Stimpfl

(10) Patent No.: US 6,659,855 B2
(45) Date of Patent: Dec. 9, 2003

(54) DEVICE FOR SEPARATING SAUSAGES FROM A STRING OF SAUSAGES

(76) Inventor: Christof Stimpfl, Hoferweg 2, 88267 Vogt (DE)

( * ) Notice: Subject to any disclaimer, the term of this patent is extended or adjusted under 35 U.S.C. 154(b) by 0 days.

(21) Appl. No.: 10/221,563

(22) PCT Filed: Mar. 13, 2001

(86) PCT No.: PCT/EP01/02766
§ 371 (c)(1),
(2), (4) Date: Sep. 11, 2002

(87) PCT Pub. No.: WO01/67875
PCT Pub. Date: Sep. 20, 2001

(65) Prior Publication Data
US 2003/0032385 A1 Feb. 13, 2003

(30) Foreign Application Priority Data
Mar. 14, 2000 (DE) .......................... 100 12 149

(51) Int. Cl.⁷ .................................. A22B 3/08
(52) U.S. Cl. ......................................... 452/49
(58) Field of Search .............................. 452/29, 30, 49

(56) References Cited

U.S. PATENT DOCUMENTS

| | | | | |
|---|---|---|---|---|
| 4,584,740 A | * | 4/1986 | Townsend ..................... | 452/31 |
| 4,847,951 A | * | 7/1989 | Kollross ....................... | 452/48 |
| 5,131,884 A | * | 7/1992 | Melanson et al. ............. | 452/49 |
| 5,145,450 A | * | 9/1992 | Staudenrausch et al. ...... | 452/47 |
| 5,709,600 A | * | 1/1998 | Xie et al. ..................... | 452/49 |
| 5,816,903 A | * | 10/1998 | Idziak .......................... | 452/49 |

* cited by examiner

Primary Examiner—Thomas Price
(74) Attorney, Agent, or Firm—Bachman & LaPointe, P.C.

(57) ABSTRACT

A device for separating sausages from a string of sausages, in which the sausages are connected by a twisted section comprising at least one clip. The invention is characterized in that a knife rotates about the twisted section, cutting the latter with its blade positioned in front of and/or behind the clip.

9 Claims, 2 Drawing Sheets

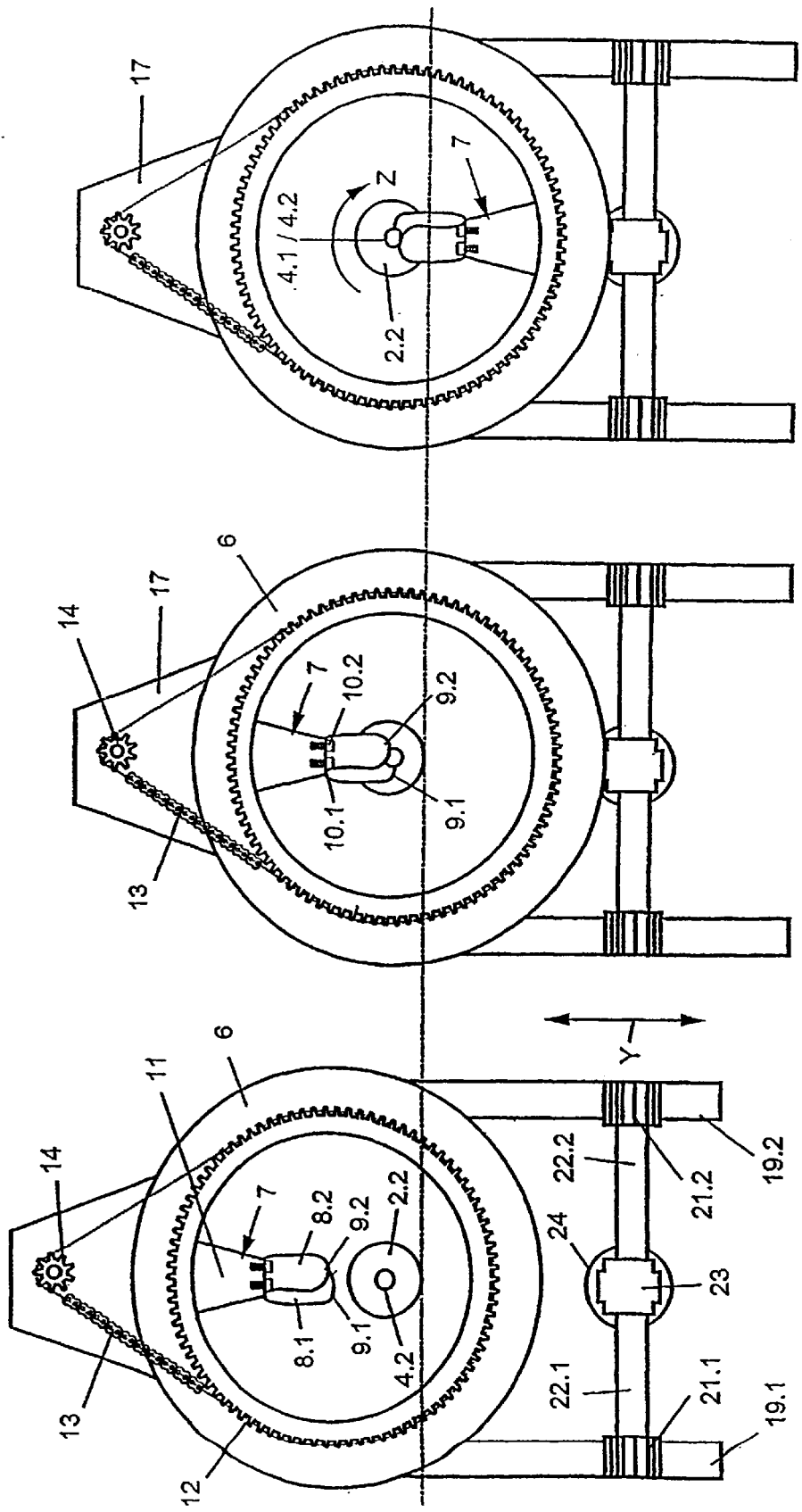

DEVICE FOR SEPARATING SAUSAGES FROM A STRING OF SAUSAGES

BACKGROUND OF THE INVENTION

The invention relates to a device for separating sausages from a sausage string on which the sausages are connected via a twist point, at which at least one clip is located, and to a method for this purpose.

A method and a device of the above-mentioned type have been disclosed, for example, by DE 43 18 301 C2 (U.S. Pat. No. 5,421,137), in which the sausages are transported by transport elements to a cutting point and are separated there from the sausage string by a cutting element. In front of this cutting point, a twist point between two sausages is determined by means of a sensor, the sensor determining a voltage drop and a voltage rise at the twist point and determining therefrom an image (contour) of the twist point between the sausages. In this way, and by means of the speed of the transport elements, the instant at which the cutting elements are active at the cutting point is determined. The cutting element is a crescent-shaped cutter which is driven by a servomotor.

The object of the present invention is to improve a device of the above-mentioned type in such a way that it becomes possible to sever a twist point as carefully as possible and in particular remove a clip provided there.

SUMMARY OF THE INVENTION

This object is achieved by virtue of the fact that a cutter, with its cutting edge, rotates about the twist point in a cutting manner in front of and/or behind the clip.

In accordance with the method according to the invention, a cutter is moved toward the twist point, so that the cutting edge bears against the twist point in a cutting manner, the cutter then being rotated about the twist point and severing the twist point in the process. The advantage of this method is that the twist point is severed in a substantially more careful manner, since the twist point is not punched by the cutter, but is cut.

The cutter preferably has at least two blades, which are arranged one behind the other in the transport direction of the sausage. This configuration of the cutter makes it possible for one or more clips to be received between the two blades, said clips then being removed together with the corresponding part of the twist point.

In order to make it possible to rotate the cutter, it is preferably to be arranged on a rotary ring. In this case, the cutter is located within the rotary ring, the cutting edges of the cutter or of the blades preferably projecting slightly beyond the center point of the rotary ring. The cutter is arranged approximately radially relative to the rotary ring.

The rotary ring is rotated by means of a servomotor. The invention thus utilizes the known advantages of the servomotor. Furthermore, this rotary ring is to be movable in the vertical. This means that, with the rotary ring, the cutter and thus the cutting edges are also brought up to the twist point, in which case the cutting edges, after the end of the movement in the vertical, are also to penetrate slightly into the twist point or at least exert slight pressure on the twist point.

Furthermore, the rotary ring is arranged on a supporting ring. The rotary ring is to be rotatable relative to this supporting ring, so that bearings, in particular ball bearings, are accordingly provided between supporting ring and rotary ring.

The rotary ring is rotated relative to the supporting ring by means of the above-mentioned servomotor, the latter being connected to the rotary ring via a corresponding drive pinion and a drive element, in particular a drive chain. In addition, the supporting ring has a corresponding bearing angle, to which the servomotor is fixed. There are many conceivable ways of moving the supporting ring in the vertical. Only by way of example, gear racks may be integrally formed on the supporting ring, pinions engaging in corresponding tooth systems, said pinions being connected via a gear unit to a drive, in particular likewise a servomotor.

It is to be emphasized that, when the cutter blades are rotated about the twist point, the twist point and in particular the clips are cut off, and, apart from that, lateral yielding of the sausages is countered by the transport elements shown in DE 43 18 301 C2 (U.S. Pat. No. 5,421,137) for the sausage string.

BRIEF DESCRIPTION OF THE DRAWINGS

Further advantages, features and details of the inventions follow from the description below of preferred exemplary embodiments and with reference to the drawing, in which:

FIG. 2 shows a front view of the parts of the device according to FIG. 1;

FIGS. 3 and 4 show a front view of the parts of the device according to FIG. 1 in different positions of use.

DETAILED DESCRIPTION

Figure 1:
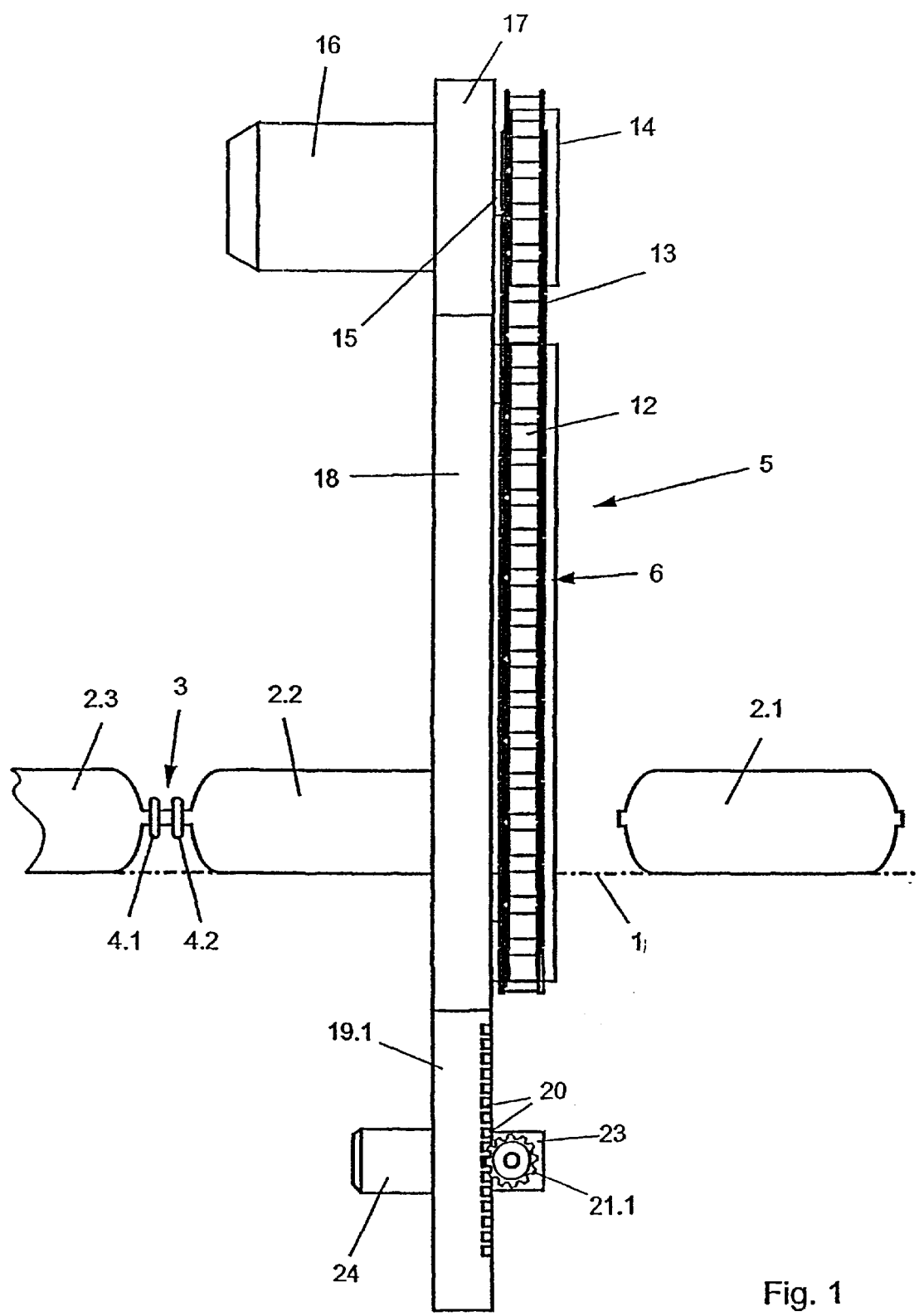
FIG. 1 shows a schematically shown side view of parts of a device for separating sausages from a sausage string.

According to FIG. 1, sausages 2.1, 2.2 and 2.3 lie on a machine plane 1 indicated here by a dot-dash line, the sausage 2.1 having already been separated from the sausage string, whereas the sausages 2.2 and 2.3 are still connected to one another at a twist point 3. The connection is assisted by two clips 4.1 and 4.2.

Corresponding transport elements for the sausage string and a recognition device for the twist point are not shown in any more detail. To this end, reference should be made to DE 43 18 301 C2 (U.S. Pat. No. 5,421,137)

A separating point 5 for separating the sausage 2.1 from the sausage 2.2 has a rotary ring 6 in which a cutter 7 (FIG. 2 to FIG. 4) is located. This cutter 7 has two blades 8.1 and 8.2 which are arranged one behind the other in the transport direction x of the sausages. Each blade 8.1 or 8.2 has a cutting edge 9.1 or 9.1, respectively. The cutter itself, for example, may consist of a metal band which is curved, both ends having the cutting edges 9.1 and 9.2. These cutting edges 9.1 and 9.2 are preferably curved concavely outward.

The cutter 7 is connected to a holder 11 via fastening elements 10.1 and 10.2. This holder 11 sits in the rotary ring 6 and can be rotated with this rotary ring 6 in the direction z. The rotary ring 6 has an external tooth system 12, in which a chain 13 engages. The chain 13 is connected to a drive pinion 14, which sits on a rotary shaft 15 of a drive motor 16. The drive motor is preferably a servomotor.

The drive motor 16 is fixed to a bearing angle 17. The bearing angle 17 sits on a supporting ring 18, on which the rotary ring 6 is also arranged via bearings (not shown in any more detail), for example ball bearings, it being possible for the rotary ring 6 to be rotated relative to the supporting ring 18 in direction of rotation z.

Projecting downward from the supporting ring 18 are two gear racks 19.1 and 19.2, the tooth system 20 of which is in A separating point 5 for separating the sausage 2.1 from the sausage 2.2 has a rotary ring 6 in which a cutter 7 (FIG.

2 to FIG. 4) is located. This cutter 7 has two blades 8.1 and 8.2 which are arranged one behind the other in the transport direction x of the sausages. Each blade 8.1 or 8.2 has a cutting edge 9.1 or 9.1, respectively. The cutter itself, for example, may consist of a metal band which is curved, both ends having the cutting edges 9.1 and 9.2. These cutting edges 9.1 and 9.2 are preferably curved concavely outward.

The cutter 7 is connected to a holder 11 via fastening elements 10.1 and 10.2. This holder 11 sits in the rotary ring 6 and can be rotated with this rotary ring 6 in the direction z. The rotary ring 6 has an external tooth system 12, in which a chain 13 engages. The chain 13 is connected to a drive pinion 14, which sits on a rotary shaft 15 of a drive motor 16. The drive motor is preferably a servomotor.

The drive motor 16 is fixed to a bearing angle 17. The bearing angle 17 sits on a supporting ring 18, on which the rotary ring 6 is also arranged via bearings (not shown in any more detail), for example ball bearings, it being possible for the rotary ring 6 to be rotated relative to the supporting ring 18 in direction of rotation z.

Projecting downward from the supporting ring 18 are two gear racks 19.1 and 19.2, the tooth system 20 of which is in each case in engagement with a corresponding pinion 21.1 and 21.2. The pinions 21.1 and 21.2 are connected to a gear unit 23, preferably a worm gear unit, in each case via a stub shaft 22.1 and 22.2. Assigned to this gear unit 23 in turn is a drive 24, via which the gear unit 23, the stub shafts 22.1, 22.2 and the pinions 21.1 and 21.2 can be set in motion. The gear unit 23 converts the movement in such a way that the pinions 21.1, 21.2 are driven in opposite directions, so that a movement of the entire separating point 5 in the direction of the double arrow y can be carried out.

The functioning of the present invention is as follows and is explained in more detail with reference to FIGS. 2 to 4:

A sausage 2.2 passes into the separating point 5 as indicated in FIG. 2. The position of the separating point and also the position of the clip or clips have been accurately determined beforehand, for example in accordance with DE 43 18 301 C2 (U.S. Pat. No. 5,421,137).

Within the separating point 5, the sausage 2.2 is stopped under the cutter 7, to be precise exactly at the location at which the blades 8.1 and 8.2 can receive the clip or clips between them. The drive 24, which is likewise a servomotor, is now activated. The pinions 21.1 and 21.2 run down the gear racks 19.1 and 19.2, the separating point 5 being moved downward in direction y. According to FIG. 3, the cutter 7, with its cutting edges 9.1 and 9.2, strikes the twist point 3, to be precise in front of and behind the clip or clips. In the process, the cutting edges 9.1 and 9.2 preferably already penetrate into the twist point 3.

The servomotor 16 is now activated and sets the rotary ring 6 in motion via the rotary shaft 15, the drive pinion 14 and the chain. The cutter 7 now rotates, as shown in FIG. 4, about the twist point and separates the two sausages 2.1 and 2.2 from one another, the clip 4.1/4.2 being removed at the same time. During the rotation, the cutter then returns again into the initial position according to FIG. 2.

Since the blades 8.1 and 8.2 are set at an angle in a dovetail-like manner, the cutter 7 virtually peels the twist point 3 together with the clip 4.1/4.2 from the sausages 2.1 and 2.2. In the process, the sausage skin is prevented from tearing.

What is claimed is:

1. A device for separating sausages from a sausage string wherein the sausage string includes a plurality of sausages connected via a twist point which is provided with at least one clip, the improvement comprising:

cutting means for separating sausages at the twist point, said cutting means comprising a cutter, first motor means for moving the cutter in a direction wherein the cutter penetrates the twist point, and second motor means for rotating the cutter around the twist point for separating the sausage from the sausage string.

2. The device as claimed in claim 1, wherein the cutter has at least two blades, which are arranged one behind the other with respect to a transport direction (x) of the sausage string.

3. The device as claimed in claim 1, wherein the cutter is arranged on a rotary ring which is rotated by the second motor means.

4. The device as claimed in claim 3, wherein the second motor means comprises a servomotor.

5. The device as claimed in claim 4, wherein the rotary ring is movable in a vertical direction by the first motor means.

6. The device as claimed in claim 5, wherein the rotary ring is arranged on a supporting ring.

7. The device as claimed in claim 6, wherein the servomotor sits on the supporting ring and is connected to the rotary ring via a drive chain.

8. The device as claimed in claim 7, wherein at least one gear rack is arranged on the supporting ring, the gear rack is connected to a pinion which is connected to a drive.

9. A method for separating sausages from a sausage string wherein the sausage string includes a plurality of sausages connected via a twist point which is provided with at least one clip, the method comprises the steps of:

moving a cutter in a direction wherein the cutter penetrates the twist point of the sausage string; and thereafter rotating the cutter around the twist point for separating the sausage from the sausage string.

* * * * *